United States Patent [19]

Fujii et al.

[11] Patent Number: 4,795,935
[45] Date of Patent: Jan. 3, 1989

[54] ULTRASONIC TRANSDUCER

[75] Inventors: Tadashi Fujii; Hiroyuki Yagami, both of Fujinomiya, Japan

[73] Assignee: Terumo Corporation, Tokyo, Japan

[21] Appl. No.: 203,591

[22] Filed: Jun. 2, 1988

Related U.S. Application Data

[63] Continuation of Ser. No. 829,830, Feb. 14, 1986, abandoned.

[30] Foreign Application Priority Data

Feb. 23, 1985 [JP] Japan .................................. 60-33693

[51] Int. Cl.$^4$ ........................ G01K 11/02; H01L 41/04
[52] U.S. Cl. ..................................... 310/336; 73/644; 310/800
[58] Field of Search ................... 73/632, 644; 310/334, 310/335, 336, 800; 128/660; 367/152

[56] References Cited

U.S. PATENT DOCUMENTS

| | | | |
|---|---|---|---|
| 4,296,349 | 10/1981 | Nakanishi et al. | 310/335 |
| 4,383,194 | 5/1983 | Ohigashi et al. | 310/327 |
| 4,523,122 | 6/1985 | Tone et al. | 73/644 |

FOREIGN PATENT DOCUMENTS

| | | |
|---|---|---|
| 0014693 | 8/1980 | European Pat. Off. . |
| 0018614 | 11/1980 | European Pat. Off. . |
| 59-9000 | 2/1984 | Japan . |
| 60-185499 | 9/1985 | Japan . |

Primary Examiner—John Chapman
Attorney, Agent, or Firm—Frishauf, Holtz, Goodman & Woodward

[57] ABSTRACT

An ultrasonic transducer includes a piezoelectric body having a reflector and an acoustic matching layer deposited on the opposing surfaces thereof. The piezoelectric body is constituted by a piezoelectric member exhibiting an acoustic impedance of from $2.5 \times 10^6$ to $15 \times 10^6$ kg/m$^2$ s, and the reflector has a thickness of less than $\lambda_2/4$, where $\lambda_2$ represents the wavelength of sound in the reflector at a frequency which is one half the free resonance frequency of the piezoelectric body. The acoustic matching layer includes a material exhibiting an acoustic impedance of from $1.6 \times 10^6$ to $4 \times 10^6$ kg/m$^2$ s and has a thickness of from $\lambda_3/8$ to $28 \lambda_3/120$, where $\lambda_3$ represents the wavelength of sound in the acoustic matching layer at a frequency which is one half the free resonance frequency of the piezoelectric body.

4 Claims, 6 Drawing Sheets

ULTRASONIC TRANSDUCER

This application is a continuation, of application Ser. No. 829,830, filed Feb. 14, 1986, abandoned.

BACKGROUND OF THE INVENTION

1. Field of the Invention

This invention relates to an ultrasonic transducer and, more particularly, to an ultrasonic transducer well-suited for use underwater or for diagnosis of a living body.

2. Description of the Prior Art

Ultrasonic transducers generally make use of a piezoelectric member which, as is well-known in the art, may be a ceramic piezoelectric member consisting of lead zirconate titanate, barium titanate, lead titanate or the like, a piezoelectric polymer member consisting of polyvinylidene fluoride or the like, or a composite piezoelectric member consisting of a polymer and a ceramic. The piezoelectric polymer member and the composite piezoelectric member have much higher workability and a lower acoustic impedence than the ceramic piezoelectric member and for this reason have come to be widely employed in ultrasonic transducers for use underwater or for diagnosis of a living body.

FIG. 2 illustrates an example of the cross-sectional structure of an ultrasonic transducer using a piezoelectric polymer member. The transducer includes a piezoelectric body 1 obtained by providing each of the opposing main surfaces of a flat, plate-shaped piezoelectric polymer member with an electrode, not shown. The piezoelectric body 1 has a reflector 2 deposited on one of its surfaces and is affixed to a support member 3 via the reflector 2. Numeral 5 denotes a specimen undergoing examination.

It is known that when an ultrasonic transducer of this construction is driven by a $\lambda_1/4$ driving waveform, namely when a $\lambda_1/4$ drive method is employed, sensitivity is maximized if the thickness of the piezoelectric body 1 is made $\lambda_1/4$. Note that $\lambda_1$ represents the sonic wavelength inside the piezoelectric body 1 at a frequency which is one half the free resonance frequency of the piezoelectric body 1.

It is known that when a single pulse voltage is applied to an ultrasonic transducer, an ultrasonic wave is radiated toward the reflector. As used herein, the term "sensitivity" S is the maximum value $V_P$ of signal voltage generated in the transducer, and the term "response" R is the dispersion of the signal waveform along a time axis about the maximum value $V_P$. Thus, the response R is in units of time and may correspond, for example, to a time interval during which the signal waveform is within one-tenth or one-hundredth of its maximum value $V_P$.

Ordinarily, the thickness of the reflector 2 is set to $\lambda_2/4$ (where $\lambda_2$ is the sonic wavelength inside the reflector). However, it has been proposed in the specification of Japanese Patent Publication for Opposition No. 59-9000 to reduce the thickness of the reflector to below $\lambda_2/4$ in order to exploit the flexibility possessed by the piezoelectric polymer member and attain a higher efficiency and a wider band.

The graph of FIG. 3 shows the results of analyzing the sensitivity and response of an ultrasonic transducer when the thickness of the reflector 2 is varied from 0 to $\lambda_2/3$. The analytic method is in line with the principle of analyzing, by a gradualistic method (or sequence definition equation method), the amplitude of a pressure wave produced under the application of a single voltage pulse, as set forth in the specification of Japanese Patent Application Laid-Open No. 60-185499. The thickness of the reflector 2 is plotted along the horizontal axis, and both the sensitivity (relative values) and response of the ultrasonic transducer are plotted along the vertical axis. The characters S and R indicate the analytical data representative of sensitivity and response, respectively, and f stands for frequency (MHz). The various materials analyzed and the corresponding acoustic impedances are shown in Table 1. It will be understood from FIG. 3 that, for a reflector 2 having a thickness within the range $\lambda_2/30$ ($=4\lambda_2/120$) to $11\lambda_2/60$ ($=22\lambda_2/120$) (A—A' line in FIG. 3), sensitivity and response are higher than for a reflector having a thickness of $\lambda_2/4$ ($=30\lambda_2/120$). This agrees with the subject matter disclosed in the aforementioned specification of Japanese Patent Publication No. 59-9000.

With an ultrasonic transducer formed from a polymeric or composite piezoelectric member, the surface of the piezoelectric body 1, namely the surface that receives the ultrasonic wave, has an acoustic matching layer 4 deposited thereon to serve as a protective layer for protecting the piezoelectric member and the electrode formed on the abovementioned surface. As shown in FIG. 1, the ultrasonic transducer ordinarily is used by being brought into contact with the specimen 5 through the intermediary of the acoustic matching layer 4.

However, the ultrasonic transducer described in the abovementioned specification does not possess an acoustic matching layer and the specification does not go beyond a description of the polymeric piezoelectric body. In general, the thickness and acoustic impedance of the acoustic matching layer are important factors which influence various characteristics of the ultrasonic transducer. Common technical knowledge in the prior art is that $\lambda_3/4$ is the preferred acoustic matching layer thickness (where $\lambda_3/4$ is the sonic wavelength inside the acoustic matching layer). However, whether $\lambda_3/4$ is indeed the optimum thickness of the acoustic matching layer has not been investigated, and neither has the relationship between the acoustic matching layer thickness and the reflector thickness.

SUMMARY OF THE INVENTION

An object of the present invention is to provide an ultrasonic transducer having an acoustic matching layer of optimum thickness and acoustic impedance and exhibiting a wide-band characteristic without any loss in the flexibility of the transducer the piezoelectric body of which is made of a piezoelectric polymer or composite piezoelectric member.

According to the present invention, the foregoing object is attained by providing an ultrasonic transducer comprising a piezoelectric body having opposing first and second surfaces, a reflector deposited on the first surface and an acoustic matching layer deposited on the second surface. The piezoelectric body includes a piezoelectric member exhibiting an acoustic impedance of from $2.5 \times 10^6$ to $15 \times 10^6$ kg/m$^2$ s, and the reflector is formed to have a thickness of less than $\lambda_2/4$, where $\lambda_2$ represents sonic wavelength internally of the reflector at a frequency which is one half the free resonance frequency of the piezoelectric body. The acoustic matching layer includes a material exhibiting an acoustic impedance of from $1.6 \times 10^6$ to $4 \times 10^6$ kg/m$^2$ s and is formed to have a thickness of from $\lambda_3/8$ to $28\lambda_3/120$, where $\lambda_3$ represents sonic wavelength internally of the acoustic matching layer at a frequency which is one half the free resonance frequency of the piezoelectric body.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
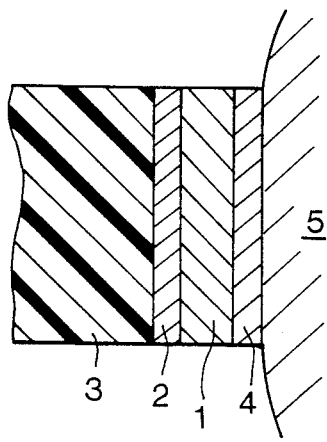
FIG. 1 is a sectional view showing the construction of an ultrasonic transducer having an acoustic matching layer in accordance with the present invention.
Figure 4:
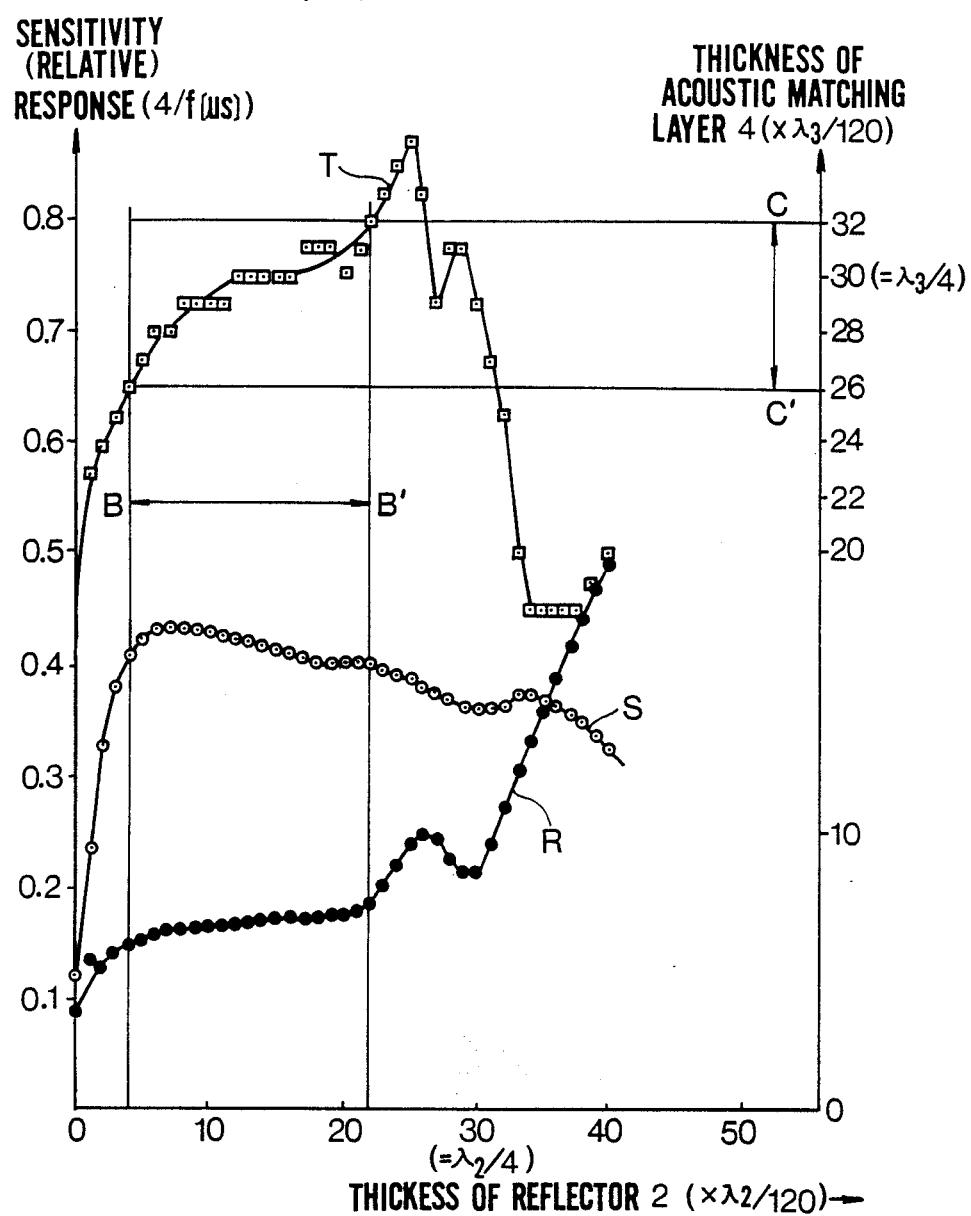
FIG. 4 is a graph indicating the optimum thickness of an acoustic matching layer with respect to the thickness of a reflector for improved response without a loss in sensitivity in the ultrasonic transducer shown in FIG. 1, wherein use is made of a piezoelectric polymer member according to an embodiment of the present invention.
Figure 5:
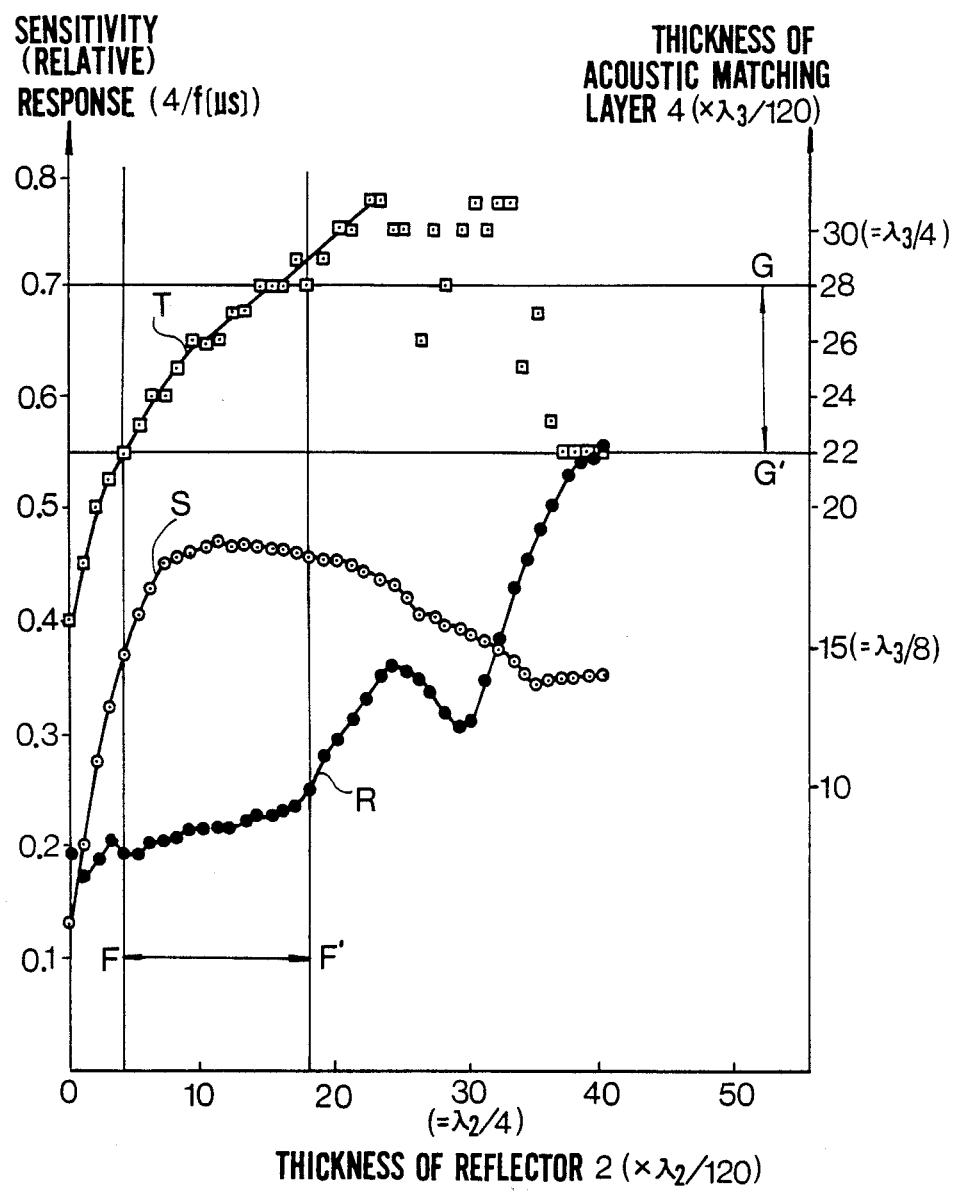
FIG. 5 is a graph indicating the optimum thickness of an acoustic matching layer with respect to the thickness of a reflector for improved response without a loss in sensitivity in the ultrasonic transducer shown in FIG. 1, wherein use is made of a composite piezoelectric member according to an embodiment of the present invention.

An ultrasonic transducer according to the present invention has the cross-sectional structure illustrated in FIG. 1. The thicknesses of the acoustic matching layer 4 in examples giving optimum analytical results with respect to the thickness of the reflector 2 are illustrated graphically in FIGS. 4 and 5. The materials and acoustic impedences used in each of the examples are illustrated in Table 1. The piezoelectric body 1 may consist of a piezoelectric polymer member or a composite obtained by kneading finely divided powder of a ferroelectric ceramic such as lead titanate or lead zirconate titanate with a polymeric material such as polyvinylidene fluoride, polyvinyl fluoride, nylon, polyacetal or polyacrylnitrile. FIGS. 4 and 5 differ in that the piezoelectric body 1 of the former is made of the polymer PVF$_2$, while that of the latter is made of a composite material. The acoustic matching layer 4 consists of a well-known polymer material such as polyester or polyimide film or a polymer composite. In the graphs of FIGS. 4 and 5, the thickness of the acoustic matching layer 4 is plotted on the right side along the vertical axis and the analytic data indicative of the optimum thickness of the acoustic matching layer 4 are indicated by the curve T.

FIG. 4 is for a case where the ultrasonic transducer is provided with the acoustic matching layer 4 as shown in FIG. 1. The optimum acoustic impedence of the acoustic matching layer 4 is decided by the acoustic impedence of the piezoelectric body 1 and the acoustic impedence of the load, namely the specimen 5, and in this case is $2.0 \times 10^6$ kg/m$^2$ s, as shown in Table 1. The load 5 is water or a living body. The curve T in FIG. 4 indicates examples in which the thickness of the acoustic matching layer 4 is optimum. It will be appreciated from the curve T that the thickness of the acoustic matching layer 4 that improves response R without detracting from sensitivity S differs depending upon the thickness of the relector 2. It will also be understood from FIG. 4 that the optimum thickness of the acoustic matching layer 4 ranges from $26\lambda_3/120$ to $32\lambda_3/120$ (C-C') where the thickness of the reflector 2 ranges from $4\lambda_2/120$ to $22\lambda_2/120$ (B-B').

Similarly, the curve T in the graph of FIG. 5 gives the optimum thickness of the acoustic matching layer 4 in an embodiment where a composite piezoelectric member constitutes the piezoelectric body 1. It will also be understood from FIG. 5 that the optimum thickness of the acoustic matching layer 4 ranges from $22\lambda_3/120$ to $28\lambda_3/120$ (G-G') where the thickness of the reflector 2 ranges from $4\lambda_2/120$ to $18\lambda_2/120$ (F-F').

Figure 2:
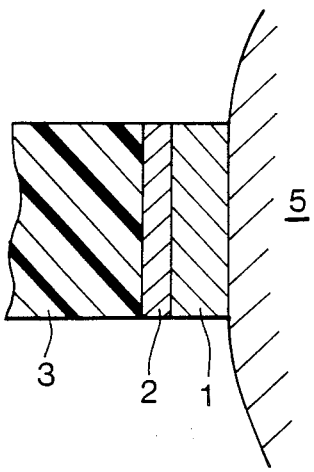
FIG. 2 is a sectional view showing the construction of an ultrasonic transducer devoid of an acoustic matching layer.
Figure 6:
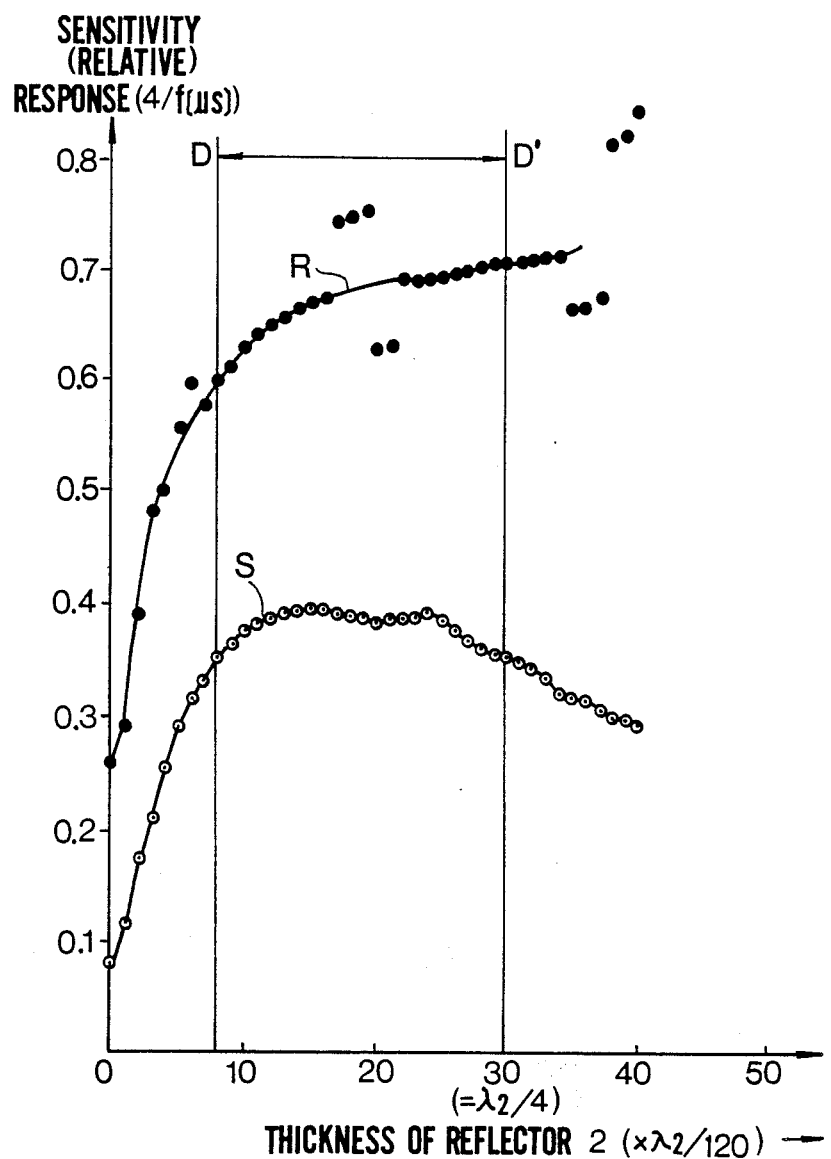
FIGS. 6 and 7 are graphs showing the relationship between the thickness of a reflector and both sensitivity and response for the purpose of making a comparison with the embodiment of FIG. 5.
Figure 7:
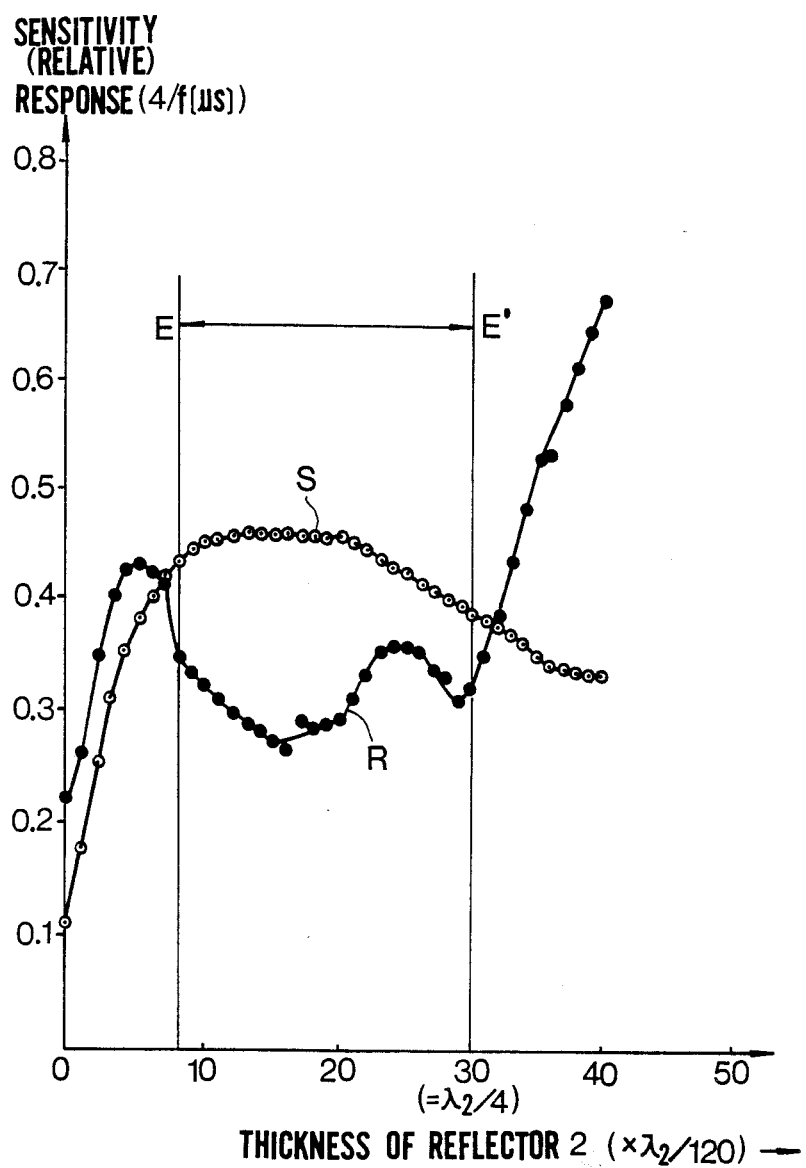

For the purpose of comparison, FIG. 6 shows sensitivity and response for an ultrasonic transducer devoid of the acoustic matching layer 4, and FIG. 7 shows sensitivity and response for an ultrasonic transducer in which the acoustic matching layer 4 has a set thickness of $\lambda_3/4$. Thus, FIG. 6 corresponds to the ultrasonic transducer having the cross-sectional structure of FIG. 2, and FIG. 7 corresponds to the ultrasonic transducer having the cross-sectional structure of FIG. 1. Other conditions are the same as those of FIG. 5, as shown in Table 1.

As will be appreciated from FIG. 6, response R can be improved without detracting from sensitivity S if the thickness of the reflector 2 is selected in the range $8\lambda_2/120-30\lambda_2/120$ (D-D'), which is less than $\lambda_2/4$.

FIG. 7 demonstrates that by providing the acoustic matching layer 4 of thickness $\lambda_3/4$, response R is markedly improved while sensitivity S is improved only marginally.

Comparing these with FIG. 5 reveals that a thickness for the acoustic matching layer 4 in the range $22\lambda_3/120-28\lambda_3/120$ (G-G') provides sensitivity and response characteristics superior to those of the conventional ultrasonic transducer having the acoustic matching layer 4 of thickness $\lambda_3/4$.

The foregoing facts show that the optimum thickness of the acoustic matching layer 4 becomes less than $\lambda_3/4$ owing to the presence of the reflector 2.

If the thickness of the reflector 2 is made as small as possible, for example zero, the overall ultrasonic transducer shifts to so-called ordinary $\lambda_1/2$ drive. If the piezoelectric body 1 in this case is subjected to $\lambda/4$ drive, it goes without saying that the optimum thickness of the acoustic matching layer 4 will be $\lambda_3/4 \times \frac{1}{2} = \lambda_3/8$. This is evident from FIG. 5, which shows that $\lambda_3/8$ is the optimum thickness of the acoustic matching layer 4 corresponding to a reflector thickness of zero.

ADVANTAGES OF THE INVENTION

According to the present invention as described above, an ultrasonic transducer including an acoustic matching layer and having a reflector the thickness whereof is less than $\lambda_2/4$ has the thickness of its acoustic matching layer selected in a range $(15/120-28/120) \times \lambda_3$, depending upon the actual thickness of the reflector. An ultrasonic transducer provided with an acoustic matching layer having this optimum thickness exhibits improved response with no decline in sensitivity. This makes it possible for the ultrasonic transducer to send and receive ultrasonic signals over a wide band.

As many apparently widely different embodiments of the present invention can be made without departing from the spirit and scope thereof, it is to be understood that the invention is not limited to the specific embodiments thereof except as defined in the appended claims.

TABLE 1

Figure 3:
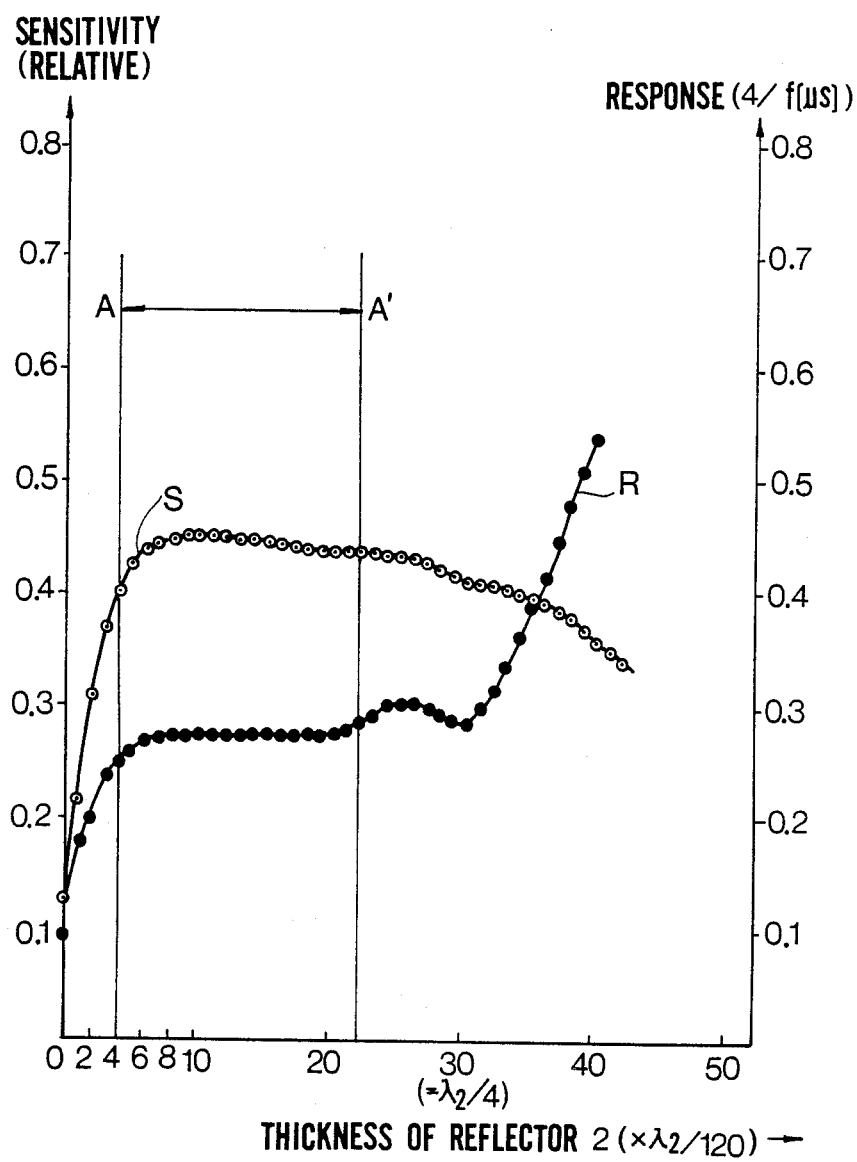
FIG. 3 is a graph showing the relationship between the thickness of a reflector of the ultrasonic transducer shown in FIG. 2 and both the sensitivity and response of the ultrasonic transducer.

|  | FIG. 3 | FIG. 4 | FIG. 5 | FIG. 6 | FIG. 7 |
|---|---|---|---|---|---|
|  | Material/Acoustic Impedence ($\times 10^6$ kg/m$^2$ s) | | | | |
| Piezoelectric Body 1 | PVF$_2$/4.0 | PVF$_2$/4.0 | Composite/10.0 | Composite/10.0 | Composite/10.0 |
| Reflector 2 | Copper plate/44.5 | Copper plate/44.5 | Copper plate/44.5 | Copper plate/44.5 | Copper plate/44.5 |
| support member 3 | Acrylic/3.0 | Acrylic/3.0 | Acrylic/3.0 | Acrylic/3.0 | Acrylic/3.0 |
| Acoustic Layer 4 | — | /2.0 | /2.5 | — | /2.5 |
| Load 5 | Water or Living Body/1.5 | Water or Living Body/1.5 | Water or Living Body/1.5 | Water or Living Body/1.5 | Water or Living Body/1.5 |

What we claim is:

1. An ultrasonic transducer comprising
a piezoelectric body having opposing first and second surfaces, a reflector deposited on the first surface and an acoustic matching layer deposited on the second surface;
said piezoelectric body including a polymeric piezoelectirc member exhibiting an acoustic impedance ($Z_T$) smaller than $4 \times 10^6$ kg/m$^2$ s;
said reflector having a thickness ($T_R$) of between 0 and $11\lambda_2/120$, where $\lambda_2$ represents a sonic wavelength internally of said reflector at a frequency which is one half the free resonance frequency of said piezoelectric body;
said acoustic matching layer including a material exhibiting an acoustic impedance ($Z_M$) of from $1.6 \times 10^6$ to $4 \times 10^6$ kg/m$^2$ s and having a thickness ($T_M$) of from $20\lambda_3/120$ to $29\lambda_3/120$, where $\lambda_3$ represents a sonic wavelength internally of said acoustic matching layer at a frequency which is one half the free resonance frequency of said piezoelectric body, and the relation $Z_O \leq Z_M \leq Z_T$ holds wherein $Z_O$ is the acoustic impedance of an object under measurement;
the transducer having thicknesses (Tr and Tm) selected according to a relationship between $T_R$ and $T_M$ such that as $T_R$ becomes thinner by $\lambda_2/120$, $T_M$ becomes thinner by a value in a range of between 0 and $3\lambda_3/120$.

2. An ultrasonic transducer comprising
a piezoelectric body having opposing first and second surfaces, a reflector deposited on the first surface and an acoustic matching layer deposited on the second surface;
said piezoelectric body including a composite piezoelectric member exhibiting an acoustic impedance ($Z_T$) not smaller than $4 \times 10^6$ kg/m$^2$ s;
said reflector having a thickness ($T_R$) of 0 to $19\lambda_2/120$, where $\lambda_2$ represents a sonic wavelength internally of said reflector at a frequency which is one half the free resonance frequency of said piezoelectric body;
said acoustic matching layer including a material exhibiting an acoustic impedance ($Z_M$) of from $1.6 \times 10^6$ to $4 \times 10^6$ kg/m$^2$ s and having a thickness ($T_M$) of from $15\lambda3_3/120$ to $29\ \lambda_3/120$, where $\lambda_3$ represents a sonic wavelength internally of said acoustic matching layer at a frequency which is one half the free resonance frequency of said piezoelectric body and the relation $Z_O \leq Z_M \leq Z_T$ holds wherein $Z_O$ is the acoustic impedance of an object under measurement; and
the transducer having thicknesses (Tr and Tm) selected according to a relationship between $T_R$ and $T_M$ such that as $T_R$ becomes thinner by $\lambda_2/120$, $T_M$ becomes thinner by a value in a range of between 0 and $3\lambda_3/120$.

3. The ultrasonic transducer according to claim 2, wherein the piezoelectric body is a composite consisting essentially of a finely divided powder of a ferroelectric ceramic in a polymeric material.

4. The ultrasonic transducer according to claim 3, wherein said powder is kneaded into said polymeric material.

* * * * *